United States Patent [19]
Sachs et al.

[11] Patent Number: 5,940,674
[45] Date of Patent: Aug. 17, 1999

[54] THREE-DIMENSIONAL PRODUCT MANUFACTURE USING MASKS

[75] Inventors: Emanuel M. Sachs, Newton; Michael J. Cima, Lexington, both of Mass.

[73] Assignee: Massachusetts Institute of Technology, Cambridge, Mass.

[21] Appl. No.: 08/831,636

[22] Filed: Apr. 9, 1997

[51] Int. Cl.[6] ................................. B22F 3/10; B22F 7/02
[52] U.S. Cl. ..................................... 419/2; 419/7; 419/36; 419/27; 419/54; 264/63; 264/414; 264/434; 425/78
[58] Field of Search ............................... 419/2, 7, 36, 27, 419/54; 264/413, 414, 434, 63; 425/78

[56] References Cited

U.S. PATENT DOCUMENTS

| | | | |
|---|---|---|---|
| 5,204,055 | 4/1993 | Sachs et al. | 419/2 |
| 5,340,656 | 8/1994 | Sachs et al. | 428/546 |
| 5,387,380 | 2/1995 | Cima et al. | 264/69 |
| 5,490,882 | 2/1996 | Sachs et al. | 134/1 |
| 5,637,175 | 6/1997 | Feygin et al. | 156/264 |
| 5,647,966 | 7/1997 | Uriu et al. | 205/78 |
| 5,656,230 | 8/1997 | Khoshevis | 264/401 |
| 5,736,084 | 4/1998 | Uchida et al. | 264/112 |
| 5,750,202 | 5/1998 | Romano et al. | 427/376.4 |
| 5,787,965 | 8/1998 | Sterett et al. | 164/155.3 |

OTHER PUBLICATIONS

Two page brochure regarding Air Atomizing Nozzles, publication date uncertain.

*Primary Examiner*—Daniel J. Jenkins
*Attorney, Agent, or Firm*—Steven J. Weissburg

[57] ABSTRACT

A process for making a component includes the steps of: depositing a layer of a porous material; positioning a mask near to the deposited layer; applying a bonding material that will cause any contacted portions of the porous material to become bonded together, over and through the mask, such that the bonding material is applied to one or more selected regions of the recently deposited layer of porous material; and repeating the foregoing three steps a selected number of times to produce a selected number of successive layers, said bonding material causing each of said successive layers to become bonded to an adjacent layer. Any unbonded porous material that is not at the selected regions is easily removed. The mask may be an open stencil mask, or a screen mask. If open stencil masks are used, there may be more than one mask for a single layer of porous material. Successive masks may be positioned by a continuous sheet, a rotating disk, or individually, such as by a robot. The porous material may be metallic or ceramic or plastic, and it may be loose powder or loosely bonded powder. The bonding material may be applied as droplets or a jet. Droplets may be applied by sonic or ultrasonic atomizer, through a nozzle, a simple orifice, or by an electrostatic arrangement, such as in electrostatic painting. The mask may be positioned in contact with the powder material or spaced away therefrom.

40 Claims, 8 Drawing Sheets

THREE-DIMENSIONAL PRODUCT MANUFACTURE USING MASKS

GOVERNMENT RIGHTS

The U.S. Government has certain rights in this invention pursuant to Contract No. DDM-9215728, awarded by the National Science Foundation.

BACKGROUND

The present invention relates generally to the field of fabrication of components. Mechanical components are fabricated in many fashions, including casting and machining. Recently, several techniques have been developed that allow the rapid fabrication of prototypes having a relatively complex geometry. Rapid prototyping techniques are summarized generally in U.S. Pat. No. 5,204,055, issued Apr. 20, 1993, in the name of Sachs et al., entitled Three-Dimensional Printing Techniques (which is incorporated fully herein by reference).

One rapid prototyping technique is known as three-dimensional ("3-D") printing, and is the subject of the '055 Sachs et al. patent application. In 3-D printing, a component is made by depositing a first layer of a porous material in a confined region and then depositing a binder material to selected regions of the layer of porous material to produce a layer of bonded powder material at the selected regions. These steps are repeated a selected number of times to produce successive layers of selected regions of bonded porous material, to form the desired component. The unbonded porous material is then removed. In some cases the component may be further processed as, for example, by heating it to further strengthen the bonding thereof.

The process may be used with a wide variety of powder materials and a wide variety of binders. Ceramic, metallic and polymeric powders may be used. Binders can be comprised of pure solvents or can carry solid material in the form of fine particles, in the form of dissolved matter, or in molten form.

For example, ceramic powder of 30 micron particle size can be spread and a binder comprised of colloidal silica with 0.1 micron silica particles can be printed into the powder. After evaporation of the water in the colloidal silica, the powder bed can be fired and the silica will sinter, resulting in a glass-bonded refractory which is useful as a mold for metal casting or as a filtration medium. The loose powder is removed after the firing operation.

In another embodiment, metal powder, such as stainless steel powder of 60 micron diameter may be spread and then joined by printing a polymeric binder. Suitable polymeric binders include aqueous based materials such as acrylic latex or solvent based systems with dissolved polymers. Printing the polymeric binder defines the green part within the powder bed. The green part can then be removed from the powder bed and post-processed, for example by sintering or by infiltrating in the manner described in U.S. patent application Ser. No. 08/551,012, filed on Oct. 31, 1995, entitled Tooling Made By Three Dimensional Printing, in the names of Samuel Allen et al. Many variations exist regarding this method, and these variations are described in the above referenced Sachs et al. patent, as well as: U.S. Pat. No. 5,387,380, issued on Feb. 7, 1995, in the name of Cima et al., also entitled Three-Dimensional Printing Techniques; U.S. patent application Ser. No. 08/422,384, filed on Apr. 14, 1995, also entitled Three-Dimensional Printing Techniques, in the names of Sachs et al.; and U.S. patent application Ser. No. 08/581,319, filed on Dec. 29, 1995, in the name of James Bredt, entitled Binder Composition for Use in Three Dimensional Printing, all five of which are incorporated fully herein by reference.

The porous material may be loose powder, or, in the alternative, bodies, such as sheets, of lightly bonded powder. If sheets of lightly bonded powder are used, the binding step may use a binder of composition different from that used to lightly bind the power in the sheet. In this manner, after the binding material is applied, the lightly bound powder in the ground regions may be removed by dissolving the binder holding it together in a solvent that does not dissolve the binder applied by printing.

3D printing is conventionally practiced using ink jet printing technology to deliver the liquid binder to the porous material. This has the advantage that the geometry of the printed layer can be changed simply by changing the instructions to the print head. Rather complex geometries can be formed, as they are made one cross-section layer at a time. Further, such technology can be scaled up somewhat by creating a print head with a linear array of nozzles.

It would be desirable to use the basic porous material and binder technology of 3D printing to fabricate very large quantities of parts that have a complex cross-section that is advantageously made using the technology. For instance, it would be desirable to fabricate large quantities of hollow parts for many applications. This would reduce the weight of the parts, and significantly increase the efficiency of any machines in which they were to be incorporated. The parts may have a contoured, varying cross-section that is difficult to fabricate in a hollow configuration using conventional technology, but which could be produced rather easily using 3-D printing. Such parts could be supplied in quantities of millions. In addition to hollow parts, it is desirable to be able to make other parts in large quantities, whose configuration renders normal powder or metallurgy methods unfeasible.

However, 3-D printing has some limitations for the fabrication of such parts in high volume. First, even a large linear array of nozzles must be swept across the full width of the powder bed thus limiting the speed with which an individual layer can be imaged. Second, ink jet printing technology is fairly expensive to build and operate and this may limit the economic capabilities of high volume production with 3-D printing. Further, ink jet printers are relatively delicate and must be carefully adjusted and monitored. The same limitations would also impact the feasibility of making large parts by 3-D printing. The common limitation is a large expanse of powder to be bonded during a relatively short time.

Thus, there is a need for an apparatus and a method that can use the basic technology of 3-D printing: namely a bondable porous material that is bound by a binder, under the high volume, high speed, robust requirements of a full scale industrial operation. There is also a need to minimize the cost of such technology, and to insure its reliability.

Thus, it is an object of the invention to fabricate components on an industrial scale, of both physical dimensions and quantities, using porous material and binder technology, at economical rates and under economical conditions. It is a further object of the invention to produce components having a complex cross-section at a high speed and low cost per component.

SUMMARY

An aspect of the current invention creates the pattern of binder on the porous material bed using relatively low cost spray technologies, where the image to be deposited is defined by a mask. This approach is particularly well suited to the volume production of parts where the geometries of cross-sectional layers repeat. For example, a cross flow filter (such as shown in FIG. 12A) might require no more than four or five different mask geometries, which are used repetitively and alternately. The approach of the current invention is also well suited to the production of very high volume parts, even when most or all layers require a unique mask such as a hollow metal powder part with varying cross-sections. Such a high volume application would justify the fabrication of many masks.

A preferred embodiment of the invention is a process for making a component. The process comprises the steps of: depositing a layer of a porous material; positioning a mask near to the deposited layer of porous material; applying a bonding material that will cause any contacted portions of the porous material to become bonded together, over and through the mask, such that the bonding material is applied to one or more selected regions of the recently deposited layer of porous material; and repeating the foregoing three steps a selected number of times to produce a selected number of successive layers, the bonding material causing each of the successive layers to become bonded to an adjacent layer.

A related preferred embodiment further comprises the step of removing any unbonded porous material which is not at the selected regions, to provide the component.

The mask comprises figure regions that are permeable to the bonding material and ground regions that are impervious to the bonding material. In another preferred embodiment, the step of applying a bonding material comprises the step of applying the bonding material over both the figure and ground regions of the mask.

The porous material may be loose powder, or loosely bonded powder.

In several different preferred embodiments, the step of applying bonding material may alternatively comprise the step of spraying droplets of bonding material at the mask, or directing a jet of droplets of bonding material at the mask, or directing a jet of continuous fluid bonding material at the mask.

If sprayed, a preferred embodiment includes the step of spraying in a conical pattern.

According to one preferred embodiment of the method of the invention, the mask is placed in contact with the deposited layer of porous material. According to another preferred embodiment, the mask is spaced away from the deposited layer of porous material.

The step of positioning the mask, in a preferred embodiment, comprises moving a mask to a stationary bonding material application station. This moving step may comprise rotating a disk or advancing a sheet upon which the mask resides, or positioning a frame in which the mask resides.

In a preferred embodiment of the invention that uses fully open stencil masks, it may be advantageous to position a plurality of stencil masks for a single layer of porous material, with a separate step of applying bonding material for each mask. Rather than positioning a stencil mask, a screen mask may be positioned.

According to another preferred embodiment, the invention is an apparatus for making a component. The apparatus comprises: means for depositing successive layers of a porous material; means for positioning a mask, having figure and ground regions, adjacent each successive layer of the porous material; and means for applying through a positioned mask, to one or more selected regions of each successive layer of porous material, after each successive layer has been deposited, a bonding material that will cause any porous material to which it is applied to become bonded at the one or more selected regions.

Yet another preferred embodiment of the invention is an apparatus for making a component. The apparatus comprises: a porous material successive layers depositor; a mask positioner, arranged to position a mask having figure and ground regions, adjacent each successive layer of the porous material; and a bonding material applicator, arranged to apply, to one or more selected regions of each successive layer of porous material, after each successive layer has been deposited, a bonding material that will cause any porous material to which it is applied to become bonded at the one or more selected regions.

In one embodiment, the mask positioner comprises a mask sheet advancer that advances a stretch of a continuous mask sheet adjacent the layer depositor. The sheet advancer may be a sheet indexer. In another embodiment, the mask advancer comprises a disk drive that advances a sector of a mask disk adjacent the layer depositor. The mask positioner may include means for positioning the mask in contact with or spaced away from any deposited porous material.

In yet another preferred embodiment, the bonding material applicator comprises a fluid jet applicator. In another, it comprises a fluid spray applicator. In yet another, it comprises a sonic atomizer, and in still another, an ultrasonic atomizer. The bonding material applicator can also be a simple orifice, a nozzle, an air atomizer or a venturi based atomizer.

With respect to another preferred embodiment, the bonding material applicator comprises an electrostatic applicator that applies a charge to any bonding material applied thereby. This is similar to equipment used in electrostatic painting. With this embodiment, it is typical to provide a charge applicator that maintains an electromagnetic field that attracts any charged bonding material toward any deposited porous material. The charge applicator can be a voltage source connected to the porous material, if it is electrically conductive itself, or connected to an electrically conductive plate on the far side of the porous material from the plate, which establishes an electromagnetic field that is adequate to attract the charged bonding material droplets to it, and thereby the porous material.

BRIEF DESCRIPTION OF THE DRAWINGS

These and other features, aspects, and advantages of the present invention will become better understood with regard to the following description, appended claims and accompanying drawings, where:

DETAILED DESCRIPTION

A preferred embodiment of the present invention uses a porous material bed, where selective regions of successive layers of powder are bonded within each layer, and between layers, by the application of a bonding material. For each layer of binder, the pattern is established by one or more masks, having relatively closed portion(s) through which the binding material can not pass, referred to herein as the "ground" portions, and relatively open portion(s) through which the binding material is deposited onto the powder material, referred to herein as the "figure" portions.

Figure 1A:
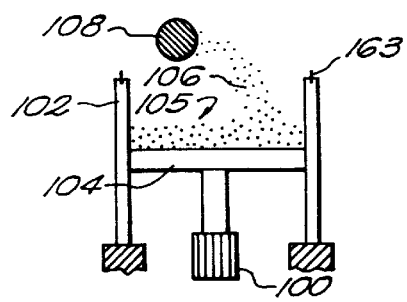
FIGS. 1A–1G represent schematically a preferred embodiment of the method of the invention for fabricating a part using multiple applications of a single mask, showing an early stage, a repeat cycle, intermediate and last stages, and a finished part.

An embodiment of the apparatus and method of the invention is shown schematically in FIGS. 1A–F. A container 102 has an open volume that contains a quantity of powdered material 106. As shown in FIG. 1A, a first layer 105 of powdered material 106, immediately adjacent a piston 104, is applied by a suitable powder spreader 108, which can be any suitable mechanism, such as are shown in the above mentioned U.S. Pat. No. 5,387,380 Cima et al and U.S. Pat. No. 5,204,055 Sachs et al and the U.S. patent application Ser. No. 422,384 Sachs et al. The powder should be deposited evenly and quickly enough, over a large enough area. Subsequent steps, described below, form a component.

Figure 1B:
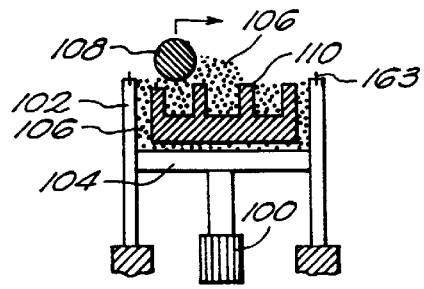
Figure 1C:
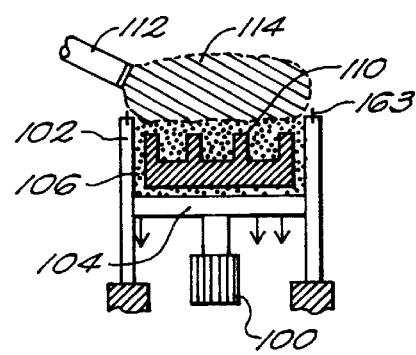

It is most instructive to first consider the part formation at an intermediary stage, during a repeat cycle. FIG. 1B shows a part 110 being formed, at an intermediate stage.

A mask 116, having binder impervious ground portions 118 surrounding binder permeable, generally open figure portions 120, is positioned adjacent (meaning, in this case, near to, but not necessarily contacting) the top surface of powdered material. A mask locator 163 helps to precisely locate the mask. A useful structure for this is a locating pin that mates with a locating hole in the mask, although any suitable orienting apparatus can be used, including optical robot and computer controlled techniques. A binder applicator 122 expels a conical pattern of liquid binder material 124, which contacts a large portion, if not all of the surface of the mask 116, covering both the open figure portions 120 and the closed ground portions 118.

Figure 1D:
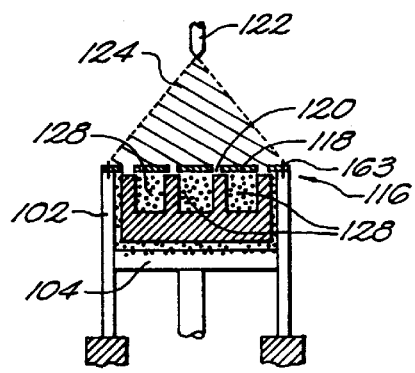
Figure 1E:
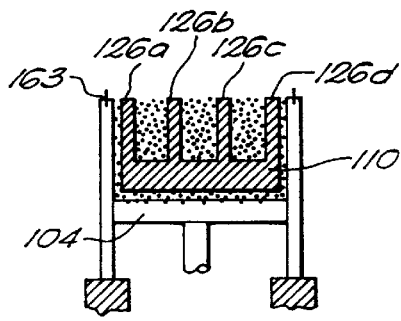
Figure 1F:
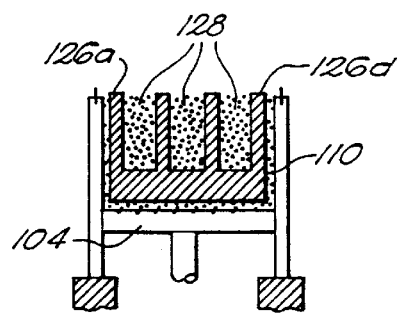
Figure 1G:
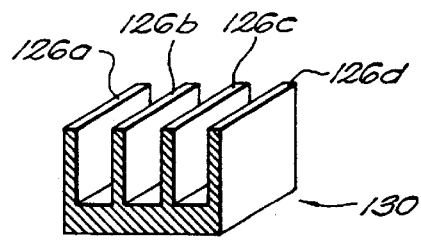

Thus, for the component shown in FIG. 1G, the binder material is deposited in the regions of the growing walls or fingers 126a, 126b, 126c and 126d. It binds the powdered material within a single layer together, at the locus of the open figure portion. The binder material is also deposited on the impervious, ground portions 118 of the mask, but does not contact the regions 128 of the powder bed under these ground portions, being blocked by the mask.

After a single layer of binder has been deposited, the mask 116 is removed from the surface of the powder, the piston 104 is drawn down to accommodate the height of a new layer of powder, for instance using a computer controlled stepper motor or micrometer 100, and the cycle is repeated. Additional powder material 106 is deposited by the powder spreader 108, as shown at FIG. 1B. The mask may be either identical in pattern to the first mask 116, discussed above, as shown in FIG. 1, or it may be different, as discussed below. If it has the same pattern, it may be exactly the same physical mask, or a different one of the same pattern. More binder material is sprayed onto the mask, over spraying both the open figure regions and the impervious ground regions, such that an additional layer of the part being formed is bound within its own layer, and also to the already formed layer beneath it.

This process is repeated over and over again, until the desired number of layers of the part have been formed. FIG. 1D shows a component relatively early in the formation stage. As shown in FIG. 1E, the walls have grown longer, and the piston 104 has been pulled down to some extent. In the final stage, shown in FIG. 1F, the part is fully formed, with relatively long walls 126a–d and unbonded powder regions 128, and the piston 104 at the lowest position.

It may be beneficial to humidify the powder material 106, using a mister 112 to apply a mist 114 of water, or other wetting material. This helps prevent the powdered material from flying about when impacted by a jet or spray of binding material, as discussed below. This step, if used, can be conducted after every powder deposition step. It is particularly useful if the binder is deposited with a high velocity, or if the porous material is particularly light and movable, relative to the momentum of the deposited binder material.

The method and apparatus have been described above with the porous material being a loose powder. In the alternative, the porous material may be bodies, such as sheets, of lightly bonded powder. If sheets of lightly bonded powder are utilized, the binding step may use a binder of composition different from that used to lightly bind the power in the sheet. In this manner, after the binding material is applied through masks, according to the present invention, the lightly bound powder in the ground regions may be removed by dissolving the binder holding it together in a solvent that does not dissolve the binder applied through the masks.

Figure 12A:
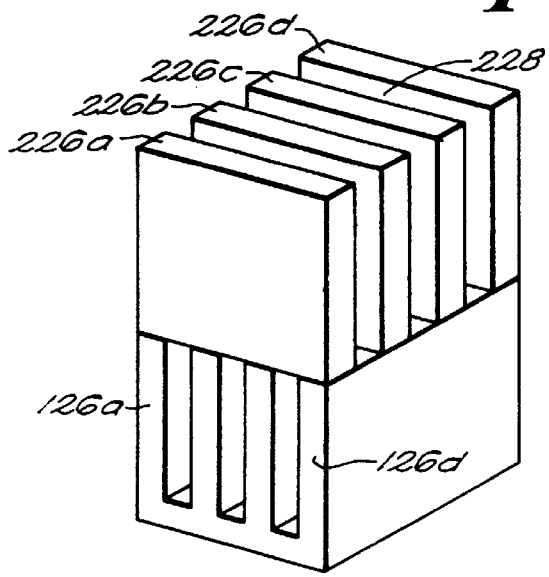
FIG. 12A shows schematically, in perspective view, a portion of a cross-flow filter fabricated using the apparatus and the method of the invention.
Figure 12B:
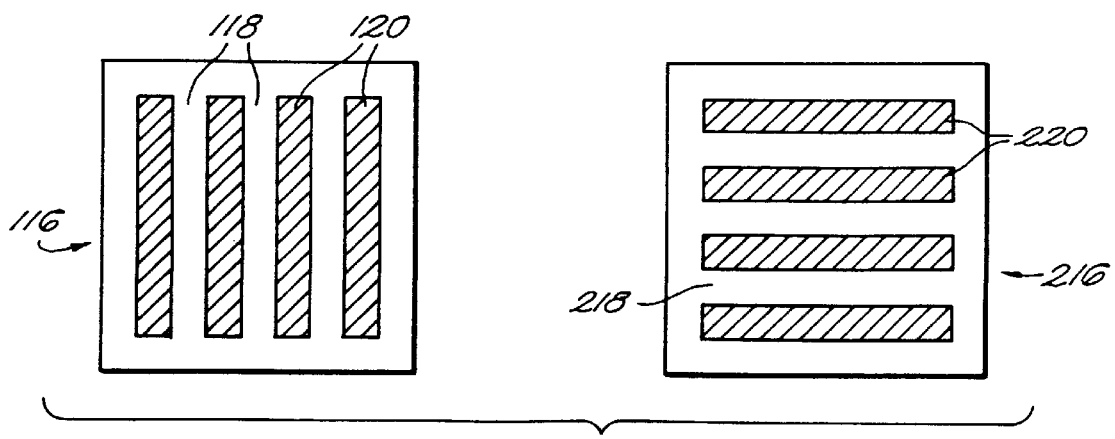
FIG. 12B shows schematically two of the basic masks that would be used to fabricate the cross-flow filter shown in FIG. 12A.
Figure 14:
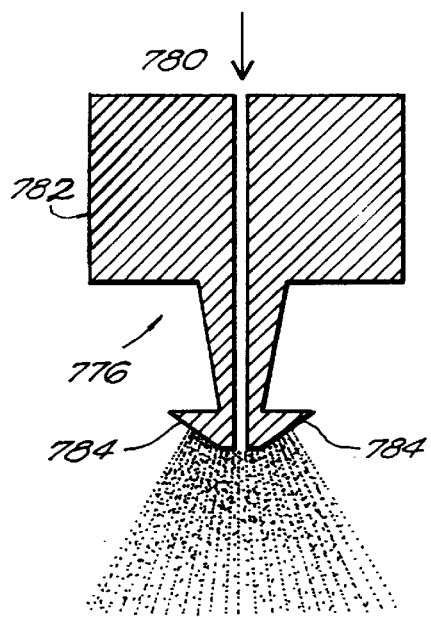
FIG. 14 shows schematically a vibrational atomizing head that may be used to deposit the binder in connection with the invention.

For the finished part 130 shown in FIG. 1G, only two different shapes of masks are required: one for the solid base; and one (116, shown schematically in FIG. 12B) for each level of the walls, such as is shown in FIG. 1D. FIG. 12A shows a schematic view of a portion of a cross-flow filter, where a third mask shape 216 (FIG. 12B), essentially identical to the second mask 116 mentioned above, but rotated 90°, would be used to form the walls 226a–d and channels 228 that are perpendicular to those formed by the mask 116.

Regarding the mask shapes, many variations exist. Some parts can be formed from a small number of masks, some of which are used repeatedly. Alternatively, the same parts could be formed with many masks, where a large number of them are identical in shape. Whether the same mask is used repeatedly, or masks with identical patterns of openings are used sequentially, would depend on several factors, including, as outlined in more detail below, the mode of mask positioning and difficulties of mask cleaning. For situations where it is difficult to clean the binder material from the mask, it might be more economical to use a large number of identical masks, that are cleaned off-line at a later time. Where it is relatively easy to clean the binder material from the mask, it might be more economical to clean the mask between the steps shown in FIG. 1D of successive cycles, while the next layer of powder is being deposited. To form the part shown in FIG. 12A, it could even be that a single mask is rotated between the formation of the lower walls 126a–d and the upper, perpendicular walls 226a–d.

Figure 2:
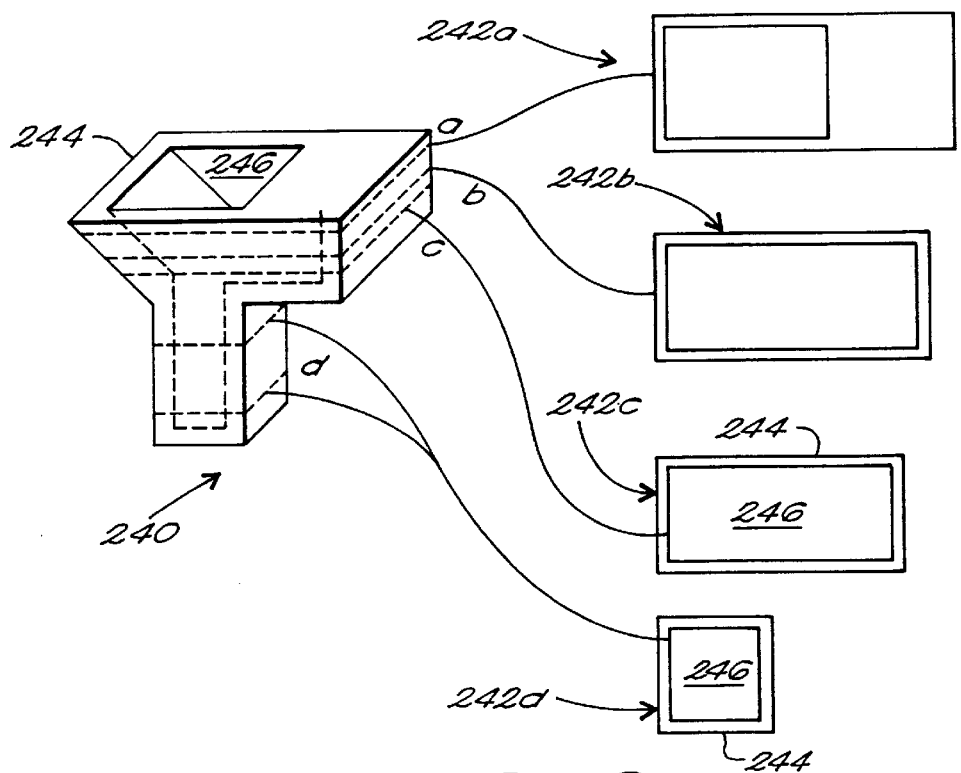
FIG. 2 is a schematic representation of an arbitrarily shaped hollow part that can be fabricated using the invention, in perspective, and at representative cross-sections.

Masks of greater variation in shape from layer to layer can also be used, for instance to form a hollow part 240, shown in FIG. 2, with a tapered, varying cross-section. The part shown in FIG. 2 has an arbitrary shape and cross-section, for illustration purposes only, and is not meant to represent any actual part. At each of the indicated levels a–d, the part 240 has a different cross-section 242a, 242b, 242c and 242d, with a solid, annular region 244 and a hollow interior 246. The section d is shown having a constant cross-section over a significant length. The top level, 242a, is shown as being partially closed relative to the open centers of sections 242b and 242c. The reentrant geometry is impossible to make with a conventional powder processing technique, such as using a punch.

Using the mask technique of the present invention, it is possible to make a large number of parts, such as the hollow exemplary part 240, in a single slab, using many layers of differently configured masks. A representative mask 247 is shown schematically in FIG. 3A, which would be used for a single cross-section, for instance d, to form the annular cross-section 242d. The mask can be of a very large extent, indicated by the break lines. Shown are the open figure regions 250 of the mask and the binder impervious ground regions 248. Thus, sites for the fabrication of thirty exemplary part cross-sections are shown. Special considerations are discussed below for the support of the binder impervious middle sections 252 of the ground portion. The mask can be as large as is practical for depositing the powder and binder material, and handling the formed block of parts.

Figure 3A:
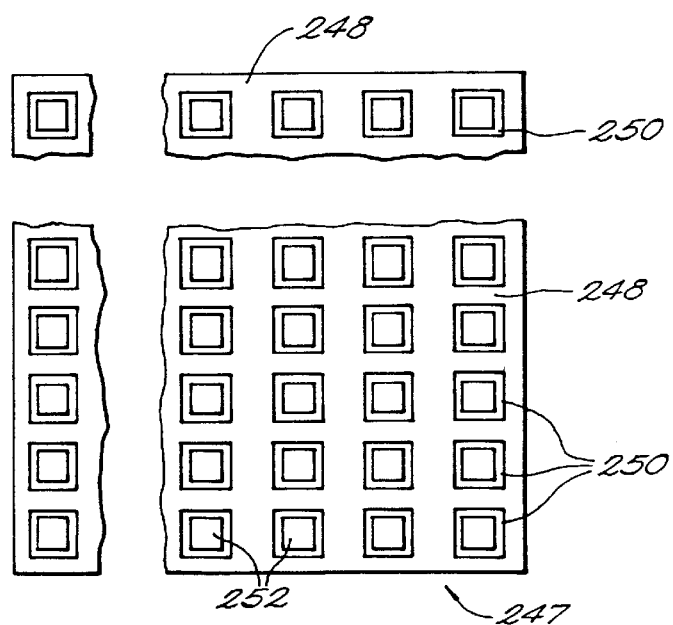
FIG. 3A shows schematically, in plan view, a mask for the fabrication of a single layer of the hollow part shown in FIG. 2, or, alternatively, a forming surface of bonded porous material.
Figure 3B:
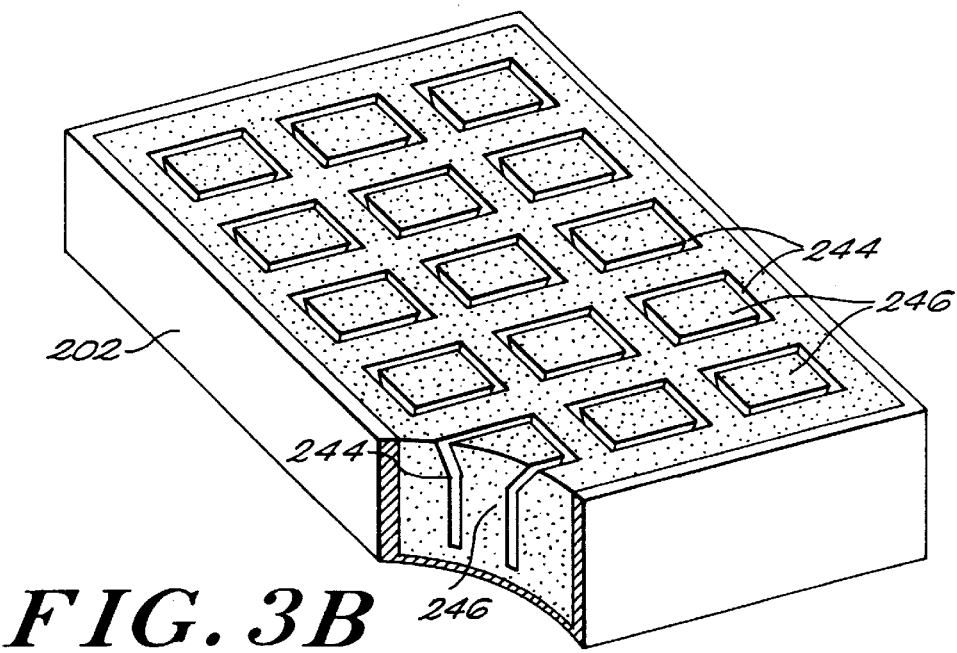
FIG. 3B is a schematic representation in perspective view, of a large number of the partially formed hollow parts shown in FIG. 2, set-up in a form, with part of the form removed.

An intermediate stage of the formation of a plurality of hollow parts is shown schematically in FIG. 3B, showing a frame 202, part of which is broken away, revealing a growing part wall 244, formed from bonded powder material, surrounding and embedded within a field of unbonded powder material 246. The upper, as formed bonded layer of additional parts, is shown across the surface of the powder bed, also surrounded by additional unbonded powder regions.

There are different types of masks that can be used, depending on the type of binder material, feature size desired, edge quality, geometry of the layer, etc. One type of mask is a screen mask, such as used in screen printing techniques, where a binder permeable screen covers the entire product region, and where the binder impervious ground regions are film-like layers that are supported by the screen and typically adhered thereto. Thus, the binder is forced through the relatively open, figure parts of the screen, onto the powder surface below. If the binder is relatively flowable, this may be accomplished without any mechanical forcing through the screen, such as by a squeegee. In such a case, it may be beneficial to use air pressure or jets of air to push the binder material through the screen. For more viscous binder liquid, a forcer, such as a squeegee may be used.

If a screen mask is used, the geometry of the mask for the hollow annulus, shown in FIGS. 2 and 3A, may simply be adhered thereto, with a floating binder impervious center portion secured to the screen, for preventing binder material from bonding the inner portion 252 of the powder bed. In general, if a screen mask is used, the binder impervious ground region need not be continuous.

Another type of mask is an open stencil mask, where the binder permeable figure regions are totally open cutouts, cut out from a continuous, solid ground region. Stencil masks may be cut out of tempered or stainless steel, brass or beryllium copper sheet, for example, using photolithography and etching techniques. Such stencil masks have the advantage of providing a clear path to the powder bed and being inexpensive to fabricate. However, it is not possible to form a bonded region of some geometries, such as an annulus, with a single mask, because there is no way to support any liquid impervious isolated islands, such as the center section of an annulus.

Figure 4A:
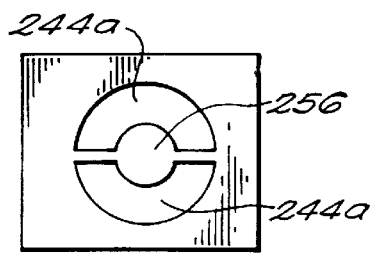
FIG. 4A shows a first of two fully open stencil masks that are necessary to fabricate an annular region using an open stencil.
Figure 4B:
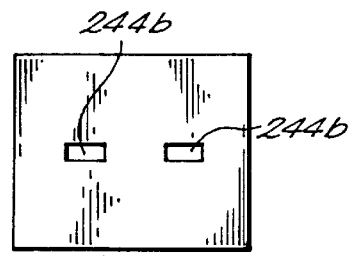
FIG. 4B shows the second of two stencil masks that is a companion to the mask shown in FIG. 4A.
Figure 4C:
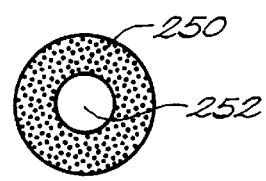
FIG. 4C shows the pattern of binder that is printed with the two open stencil masks shown in FIGS. 4A and 4B.

With a stencil, to form an annulus, a pair of masks as shown in FIGS. 4A and 4B are used, where the first mask 1 allows the deposition of binder material in two separate, non-continuous, open regions 244a, and the second mask 2 allows the deposition of binder material in the two smaller separate, non-continuous, open regions 244b, which served to support the central mask portion 256 of the first mask 1 and thus were shadowed from binder. The resulting pattern of binder is shown in FIG. 4C, having a bonded annulus 252 and an unbonded center portion 250. No additional powder would be deposited between the application of binder using the first mask and the second mask. Thus, the stage shown at FIG. 1D would be conducted twice with the two different masks, before the cycle repeats, returning to the stage shown in FIG. 1B. Some degree of overlap should be provided between the figure regions of binder deposited through the two screens to ensure that there are no gaps of binder present. Screen masks do not require this sort of paired masks to prevent a bonded island from forming.

Thus, using a series of masks, a complicated three-dimensional shape can be made from a powdered material by selectively bonding together regions in a series of layers, by depositing liquid bonding material through a mask.

There are various ways to deposit the next successive layer of powder on the surface of the forming part. As shown in FIGS. 1E and 1F, the piston 104 moves down a small bit after the deposition of each new layer of powder material. Thus, the volume in which the part is being formed deepens, with the powder being deposited at the same level compared to a fixed frame of reference.

It is also possible to maintain the base of the forming part fixed, and to raise the level of the deposition of powder, with an appropriately regulated indexing mechanism. Rather than using loose powder, as has been mentioned, bodies, such as sheets of loosely bound powder can be used, which are positioned at a binder deposition site by suitable handling equipment. Powder spreading is discussed in general in the above referenced U.S. Pat. No. 5,204,055, to Sachs et al., and U.S. Pat. No. 5,387,380 to Cima et al. and U.S. patent application Ser. No. 422,384 to Sachs et al., all of which have been incorporated herein by reference.

Figure 6A:
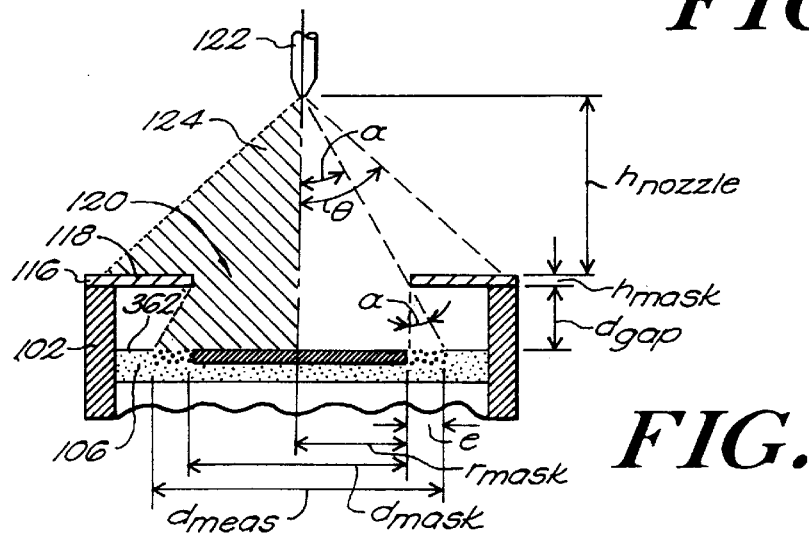
FIG. 6A shows schematically in a cross-sectional view, an embodiment of the invention using a nozzle that produces a conical spray of liquid binder droplets, and a stencil that is supported a distance away from the powder surface, showing the phenomenon of radial expansion, illustrated with a stationary nozzle.

One factor to consider is the proximity of the mask to the surface of the porous material, the parameters of which are outlined schematically with reference to FIGS. 6A, B and 7. In general, with a spreading conical spray 124 of binder, the closer that the mask 118 is to the surface 362 of the porous material 106, the closer will be the pattern of the bonded porous material in size and shape to the opening 120 in the mask 116. However placing the mask directly on the powder is sometimes not practical because the powder will be disturbed each time that the stencil is removed and replaced.

To consider this factor, it is helpful first to regard a situation where a stationary nozzle 122 deposits binder on a stationary mask and porous material bed. This situation may be used, however, more typically, one or the other of the nozzle or the bed will be moving, as is discussed below.

As the stencil location is moved away from the level of the powder, the size of the image projected onto the powder expands. This is because the droplets of binder are emitted from the nozzle at an angle as shown in FIG. 6A. As the distance of the gap between the stencil and the powder bed $d_{gap}$ varies, so will the radial expansion of a deposited layer. Radial expansion, e, is defined as the difference between the size of the maximum extent of deposited bonding material and the size of the mask cutout. As shown in FIG. 6A, the angle θ is the conical angle formed as the binder is sprayed from the nozzle, and α is the angle contributing to radial expansion.. (Note that as the nozzle moves relative to the mask, as described below, α changes, at times being equal to θ.)

In general, the expansion e can be represented roughly as follows :

$$e = k \frac{r_{mask} d_{gap}}{h_{nozzle}},$$

where $r_{mask}$ is proportional to the size of the opening in the mask and k is an appropriate scale factor. Thus, as the size of the bonded part increases or the gap distance $d_{gap}$ between the mask and the powder bed increases, the radial expansion will increase as well. Also, radial expansion varies inversely with the distance between the nozzle and the mask.

Figure 6B:
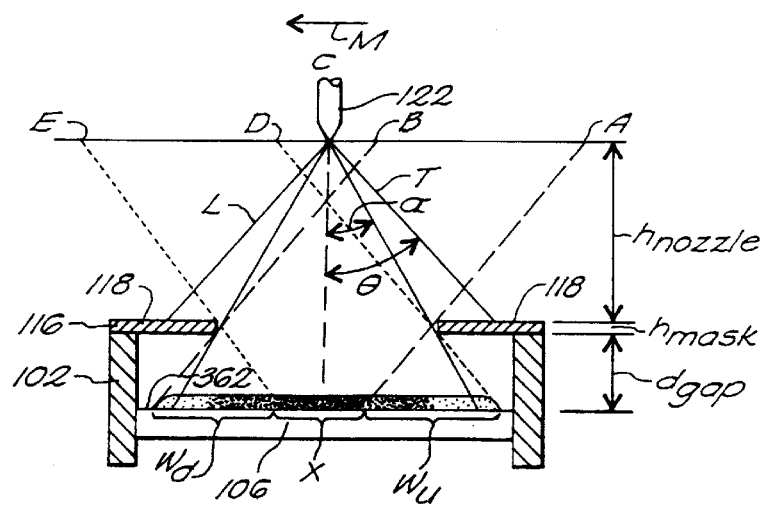
FIG. 6B shows schematically in a cross-sectional view, an embodiment of the invention using a nozzle that produces a conical spray of liquid binder droplets, and a stencil that is supported a distance away from the powder surface, showing the effect of motion of the nozzle on binder uniformity.

Turning now to the more general case of relative motion between the nozzle and the mask, shown in FIG. 6B, the same situation as shown in FIG. 6A is shown, with four other positions for the nozzle indicated at A, B, D and E. A single point source can raster over the entire area to be bonded, moving first along one dimension (across the page, as shown in FIG. 6B), indexed along the other dimension an increment (into the page, as shown in FIG. 6B), and then again sweeping along the first dimension. Alternatively, a line source aligned along the second dimension (into the page) can be swept across the first dimension (across the page), and then, depending on the size of the workspace in the second dimension, indexed along the second dimension.

The relatively central position C is the same as is shown in FIG. 6A. FIG. 6B represents the situation where the nozzle 122 moves from point A to point E, along the arrow M, relative to the mask 116. The dashed line from point A to the surface 362 of the powder bed 106 indicates the leading edge L of the envelope of the conical pattern of deposited binder material when the nozzle is at point A. This then is the first nozzle location from which any binder material will be deposited on the surface 362. As the nozzle 122 moves along in the direction M, binder will be deposited on the surface 362 of the porous material, with the leading edge of the conical pattern contacting fresh regions of the surface that have not yet been contacted. When the nozzle reaches point B, the leading edge L follows the dashed line from point B to the surface 362. As the nozzle 122 moves further along the direction M, for instance to the mid-point C, the leading edge L of the conical pattern falls upon the solid ground portion 118 of the mask 116, and does not contact the porous material.

At the mid point, the trailing edge T of the conical spray pattern is still falling on the solid ground portion 118 of the mask 116, and continues to do so until the nozzle reaches the point D, at which point the trailing edge T contacts a region of the powdered material under the overhang of the mask, which has not yet been contacted. The trailing edge moves along, continuing to contact the powdered material until the nozzle reaches the downstream point E, beyond which the mask 116 completely shields the powdered material from the conical spray pattern.

Thus, the result is that several regions of different quantities of binder deposition arise. The centermost region X, under the mask opening, receives a uniform amount across its width, because it is contacted by the full conical region of spray, from the leading edge L to the trailing edge T. The upstream and downstream wing portions, $W_u$ and $W_d$, respectively, receive a non-uniform amount across their width, with more binder material being deposited nearer to the center region X. No binder material is deposited between the outer extremes of the wing regions and the container walls 102.

The foregoing has illustrated the relevant parameters with motion along one dimension. If the source is also moved along the second dimension, which is possible, the same considerations of shadowing and overlapping spray, would apply for this second dimension. Further, because the binder is deposited over an area that also extends in the plane into and out of the page, as shown, similar considerations will apply across this entire dimension, where consideration must be taken of the precise mask pattern.

Figure 7:
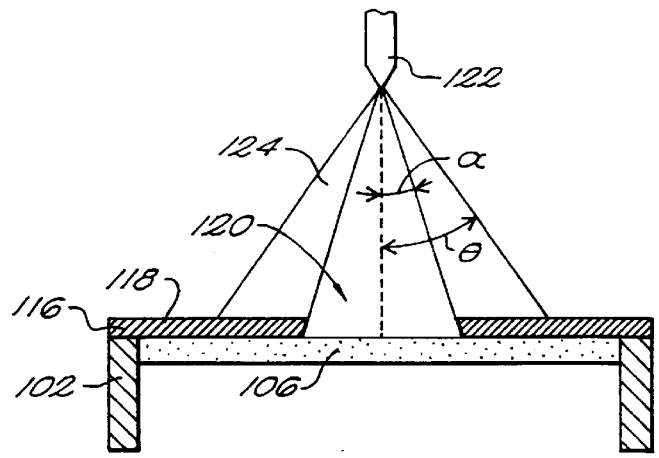
FIG. 7 shows schematically in a cross-sectional view, an embodiment of the invention using a nozzle that produces a conical spray of liquid binder droplets, and a stencil that contacts the powder surface, showing minimal radial expansion.

There are cases where it is possible to contact the mask directly to the porous material, in which case the phenomenon of spread is essentially removed. For instance, if the porous material is contained in a sheet of loosely bound powder, as discussed above, the propensity for disturbing the powdered material is minimized. Similarly, direct contact can be maintained if loose powder is used, but some condition exists that will minimize the likelihood of disturbance. Such conditions include if the powder has been humidified, which tends to stabilize it against disturbance, or if the grains of powder are relatively large and/or heavy, and hence not easily disturbed. Such a configuration is shown schematically with reference to FIG. 7, with similar reference numerals representing similar components.

Another related consideration is the minimum feature size that can be established using the bonding technique. The minimum feature size depends on the grain size of the powder and the droplet size emitted from the nozzle 122. The estimated minimum width of a printed part primarily depends on the behavior of the droplet when it passes through the mask as the opening in the mask becomes smaller. The opening in the mask reaches a critical minimum size, smaller than which no drops will pass freely through. The result will be an ill defined image produced on the powder bed. Some of the droplets would begin to stick to the mask opening edges. Other drops would bounce off of the mask and be redirected. (This issue is present regardless of feature size. However, it is more of a problem (from a percentage perspective) as for smaller features.) Further, as the openings of the mask get smaller, more binder material will tend to collect along the edges of the mask opening, creating a potential dripping phenomenon. Dripping presents a control problem because any drops that drop off the mask into the opening would be much larger than the intentionally applied drops.

An additional concern relates to pooling of binder on the mask, and cleaning of the masks. In a preferred embodiment, the binder is sprayed over the entire expanse of the mask, either from a stationary or moving nozzle, depending on the relative size of the mask and the spray parameters of the nozzle. The binder contacts the powdered material through the openings, and causes them to bind. At the locations of solid ground of the mask, the binder contacts the mask and bounces, or flows, or pools, depending on the volume, and viscosity of the binder fluid and the surface characteristics of the mask.

It is necessary to balance several countervailing needs. The viscosity of the binder should be low enough such that it can be sprayed from a nozzle, or airbrush, or other application apparatus, and flow to the desired depth in the powdered material. It should not be so low, however, that it creates an uncontrollable sloshing puddle on the surface of the mask, which might cause problems during the removal of the mask. It is possible to provide some surface treatment to the mask, for instance to physically roughen it by etching, or abrading, so that the surface holds the liquid better than would a smooth or untreated surface. However, such surface treatments typically render it more difficult to clean the mask after use. In many applications of the invention, it is important to be able to clean and reuse the masks, so that the cost of fabrication of the masks can be amortized over a large number of fabricated parts.

Thus, what is desired is a workable balancing of the properties of viscosity, adherence to the mask and mask surface properties, so that the binder can be deposited on the powder bed to form the part, and be retained on the mask so that the part is not spoiled, but can then be removed from the mask so that the mask can be used again.

Figure 5:
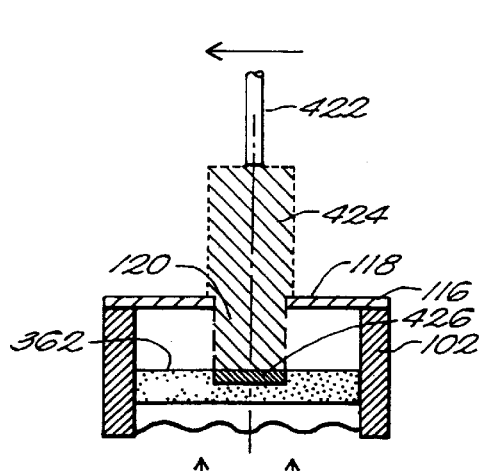
FIG. 5 shows schematically in a cross-sectional view, an embodiment of the apparatus of the invention using a nozzle that produces a cylindrical jet of liquid binder, and a stencil that is supported a distance away from the powder surface.

As shown in FIG. 6A, a nozzle 122 sprays binder material through a conical region 124 of space. It is also possible, as shown in FIG. 5, to have a nozzle that directs a cylindrical jet, typically circular, with an essentially constant cross-section. The jet may be continuous, or of discrete droplets at the point it contacts the porous material. (Typically, all continuous jets break up into droplets at some distance from the nozzle, depending on initial velocity and other factors.) Typically, the diameter of the nozzle is on the order of 50–200 μm. The droplets of binder approach the mask 116 perpendicular to its surface, and pass through the opening 120 to be deposited in the part region 426 of the powder bed 362. The nozzle is moved over the entire area of the opening 120 so that binder is applied over the entire region of the porous material. The amount of radial expansion is very small, because there is no cone angle of attack. Thus, the size and shape of the bonded material is virtually identical to the opening in the mask 120.

Thus, the binder application parameters include shape of the spray pattern, droplet size, operating pressure and cost. Beneficial results have been obtained with an apparatus that generates a substantially conical spray pattern of fine droplets at low pressure. Apparatus that can achieve this are air brushes or nozzles (using air atomization, such as by venturi effect), ultrasonic or sonic mist atomizers and electrostatic painting-type applicators.

An airbrush having an internal mix, has been used. It produces a fine spray with variable air:liquid ratio capabilities. It also has a wide assortment of head, needle and tip assemblies. Such an airbrush has a nozzle, which has an adjustable aperture therein, using conventional needle and tip configurations. An air supply establishes a venturi partial vacuum condition inside the chamber of the airbrush, which draws liquid binder material from a binder supply, and emits it from a nozzle.

Figure 13:
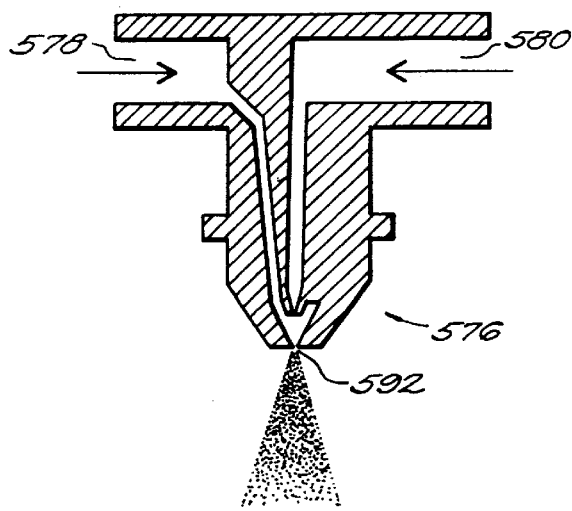
FIG. 13 shows schematically a venturi-effect nozzle that may be used to deposit the binder in connection with the invention.

A conventional venturi-type atomizing nozzle is shown in FIG. 13. The nozzle 576 has an air inlet 578 and a binder material inlet 580. The moving air creates a partial vacuum that draws the binder through the channel and projects it out through the nozzle orifice 592 in a conical pattern spray.

In addition to a pure vacuum venturi-type nozzle, air atomizing nozzles that include an air line along with a pressure fed liquid supply line may also be used. With such a device, the gas flow helps to atomize the liquid, so that it is not provided in a jet, but rather in a spray.

Ultrasonic mist spraying uses an ultrasonic horn 776 connected to a supply line 780 for liquid binder, which passes through a vibrator 782 that is vibrated ultrasonically to emit a mist of droplets. The droplets are expelled from the surface of the horn tip 784. Generally, droplets emitted by an ultrasonic device travel at a relatively low speed, and without much direction. This can be advantageous, as it minimizes disturbance of the powder bed. However, the lack of directionality is disadvantageous. In some circumstances, it may be convenient to enhance directionality by blowing air with the stream as a shroud. Ultrasonic hardware with such a shroud feature is conventionally available, such as from Sono-tek Corp. of Poughkeepsie, N.Y.

Figure 15:
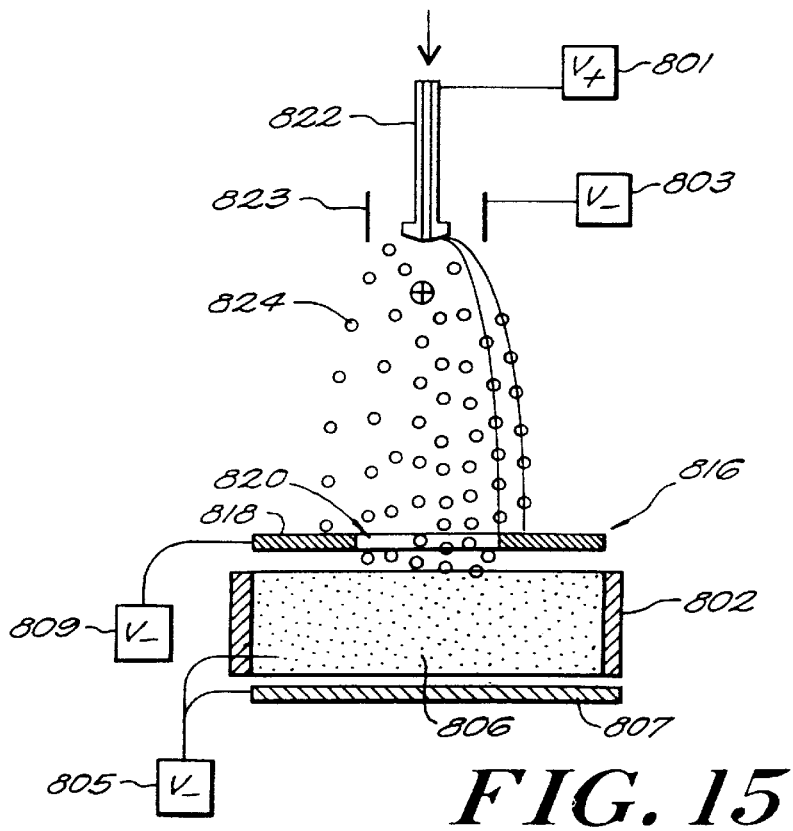
FIG. 15 shows schematically in a side elevation, an embodiment of the apparatus of the invention using an electrostatic binder spraying apparatus.

Electrostatic droplet dispensing is shown schematically in FIG. 15. Electrically charged liquid droplets 824 are directed generally toward an oppositely charged bed of powder 806.

As shown, the droplets are positively charged and the powder is negatively charged, although these polarities could be reversed. The droplets are dispensed from an appropriate applicator 822, such as an ultrasonic horn. Initially, the droplets may be part of a continuous jet stream, but they break off from the stream relatively close to the applicator head 822. When dispensed from the applicator 822, the droplets 824 are not particularly directional. As they move farther from the dispensing unit, they are strongly attracted toward the powder bed 806. They are pulled toward the bed, some passing through the opening 820 in the mask 816, and some being blocked by the solid portions 818. Thus, they are directed strongly toward the bed, essentially along substantially collimated paths without the need for precisely controlling the direction of their emission.

The droplets can be charged and directed in any appropriate manner. One such manner is shown in FIG. 15. The droplets are charged positively by virtue of having passed through the applicator 822, which is positively charged by connection to a positive voltage source 801. They pass through a ring 823, which is charged oppositely from that of the applicator 822 and the droplets 824, for instance negatively charged if a positive charge has been applied to the droplets, by connection to a negative voltage source 803. A capacitance is set up between, on the one hand, the positively charged applicator 822 and any continuous stream of liquid extending therefrom; and on the other hand, the negatively charged ring 823. This capacitance establishes an electric field that helps to control the level and magnitude of the field in the vicinity of the applicator 822, helping to ensure that the droplets are charged in a consistent manner. The powder bed 806 is connected to a voltage source of the opposite polarity, in this case, negative.

What is important is that the droplets be charged. An electric field is established that attracts the charged droplets toward the powder bed. If the powder is metallic, it is charged itself by connection to a negative voltage source 805, and that establishes the field. If the powder is not metallic, a charged plate 807 may be located under the powder (distant from the droplet applicator 822) and the droplets 824 are attracted toward the plate, and hit the porous material therebetween. If the powder is not metallic, some mechanism must be provided to bleed the charge that would otherwise accumulate in the powder bed. This may be accomplished through the binder liquid itself. Typically, the mask would also be maintained at the same polarity as the powder bed, at a potential of equal or lesser magnitude, as shown by connection to the negative voltage source 809. In some circumstances, it may be beneficial to maintain the mask at a ground potential.

Alternatively, the droplets can be charged according to any of the methods used for charging paint droplets in conventional electrostatic paint processes.

In most situations, it is desirable to produce droplets of binder liquid, in other words, atomized liquid. The droplets can be deposited unidirectionally, such as in a stream, in a conical pattern, such as from a spray, or along collimated paths, such as in the electrostatic embodiment. If droplets are not used, a fine jet may be used. Care must be taken that the jet not be so energetic that it disturbs the powder.

Figure 11:
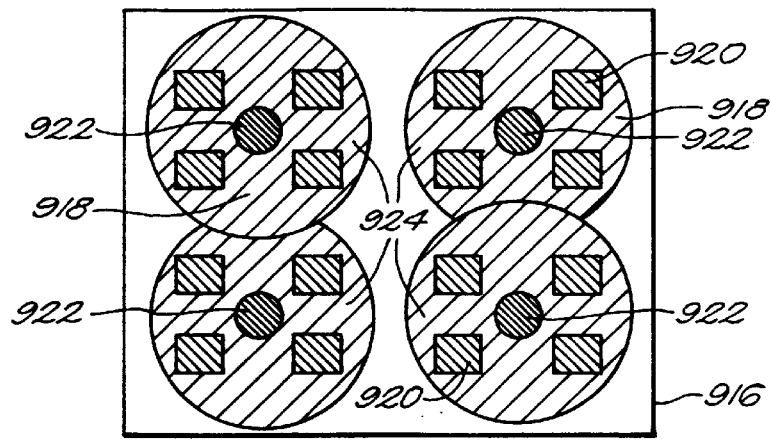
FIG. 11 shows schematically in a plan view, an embodiment of the apparatus of the invention that employs multiple spray nozzles to cover a large area.

An embodiment of the invention using multiple nozzles is shown schematically in a plan view in FIG. 11. Multiple nozzles 924, of which four are shown, are positioned above a mask 916, which includes square open figure regions 920 and solid ground regions 918. Each nozzle 922 deposits binder material over a circular region 924 of the mask 916. Although the circular regions 924 of binder deposition are shown to overlap in some areas, they do not overlap at any open figure regions 920. Thus, each open region receives binder material from only one nozzle 922. This is not necessary. However, if binder from more than one nozzle contacts the porous material through an open region 920, that must be taken into consideration when deciding upon binder flow, duration, layer thickness, and other parameters.

To produce the circular pattern, each nozzle may be stationary, or may produce a smaller stationary pattern, and is then moved, for instance by translation, or swiveling the aim, to produce the larger circular pattern.

Another method of arranging a multiplicity of nozzles is to arrange them in a linear array and then to sweep the array over the bed.

Figure 8A:
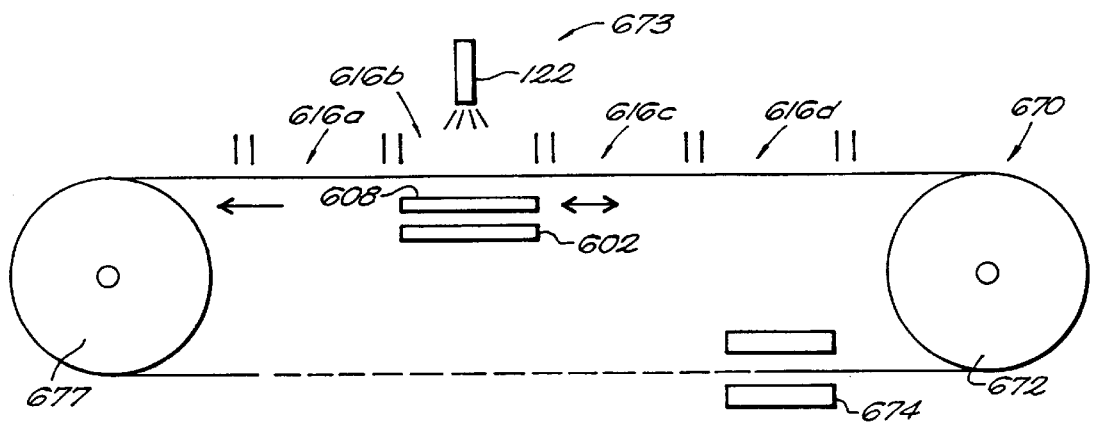
FIG. 8A shows schematically in a side elevation, an embodiment of the apparatus of the invention having a roll of masks, each of which is brought adjacent a stationary porous material and binder deposition stage.

There are various ways to position the mask over the porous material bed. Several are shown schematically with reference to FIGS. 8A and 8B and 9A and 9B. FIG. 8A shows schematically an embodiment where a series of masks 616a–616d (and more not shown) are maintained on a continuous roll 670, from a supply 672. For a given stage of production, for an embodiment using loose powder, a powder spreader 608 deposits a fresh layer of powder within the support 602 that contains the powder material and the growing components. This support 602 includes the types of components shown in FIG. 1. The spreader is movable so that it does not impair the deposition of binding liquid, discussed below. The deposited powder may also be humidified, such as by a water mister 112 described above in connection with FIG. 1.

The appropriate mask, for instance 616b, is positioned at the spraying stage adjacent the deposition device 122 and the support 602. Liquid binder material is sprayed (or jetted) from the spraying device 122, covering the entire surface area of the mask 616b (either from a stationary position, or by virtue of a pass in one or more directions, or by virtue of multiple nozzles), such that binder material is selectively deposited on the upper layer of powder material. The mask is then removed from its place closely adjacent to the powder surface and a new layer of powder is applied to the top thereof. The roll 670 then advances so that the next mask 616c is in place, and a new layer of binder material is deposited.

Figure 8B:
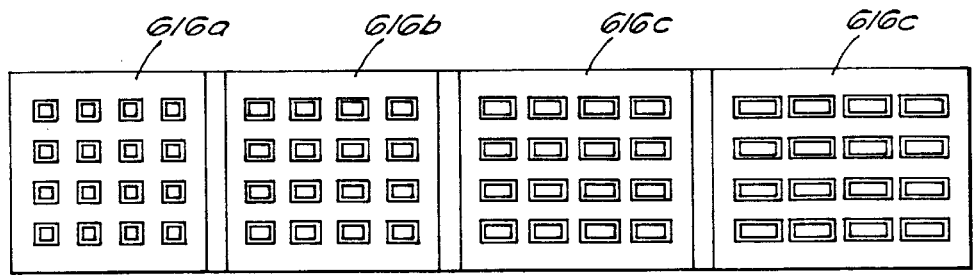
FIG. 8B shows schematically, in a plan view, a portion of the roll of masks used with the embodiment of the invention shown in FIG. 8A.

The series of masks 616a, 616b, 616c, 616d . . . , is shown schematically with reference to FIG. 8B. This diagram shows schematically different cross sections for the fabrication of a hollow part, such as shown in FIG. 2, with each mask 616x corresponding to the mask 246 shown in FIG. 3A. Thus, as the part grows, and as new masks are advanced, each layer is composed of rectangular annuli having a larger area.

The roll 670 may be continuous, as shown, with a binding material cleaning stage 674 positioned at some point after the binding material deposition stage 673. Cleaning may be accomplished by any appropriate equipment.

The roll may be advanced continuously, one mask for each new layer of powder material. In some cases, if a pair of masks, such as are shown in FIGS. 4A and 4B are required to fabricate the desired geometry, there may be no powder spreading step between two binding material deposition steps. Further, some geometries, such as the part shown forming in FIGS. 1B–1D, require the identical pattern of mask for numerous layers. In that case, it may be possible to use the same mask for more than one step of binder material deposition. This will depend on the issues of dripping and mask cleanliness discussed above. In such a case, it may be useful to clean the mask at the binder deposition site 673, or to temporarily move it slightly away from the deposition configuration, and then back again to placement closely adjacent to the surface of the powdered material.

The roll 670 is shown as continuous, returning to the supply 672 after a cleaning stage 674. However, it may be a single line roll, that is fed from a supply 672 to a pickup 677, which is then removed and taken elsewhere for cleaning or discard, depending on the relative costs of each. The number of separate masks may be as few as two or three, or as many as several thousand. The roll apparatus is particularly advantageous with a high number of masks. The number of individual parts formed has no limit, depending only on the physical dimensions of the apparatus, which can be scaled to very large, using conventional engineering principals.

If loosely bonded sheets of powder are used, rather than a powder spreading apparatus, apparatus is provided for placing the sheet or other geometry.

A single nozzle 122 is shown in FIG. 8A. It is also possible to use many jets or nozzles spaced apart that combine to cover the entire area of parts being formed. Each jet can be stationary, or can move through a prescribed pattern. Further, each nozzle fixture may have more than one orifice therin, thus producing a plurality of jets or spray streams.

The nozzle placement considerations will be understood by the designer, and can be modified as appropriate.

Figure 9A:
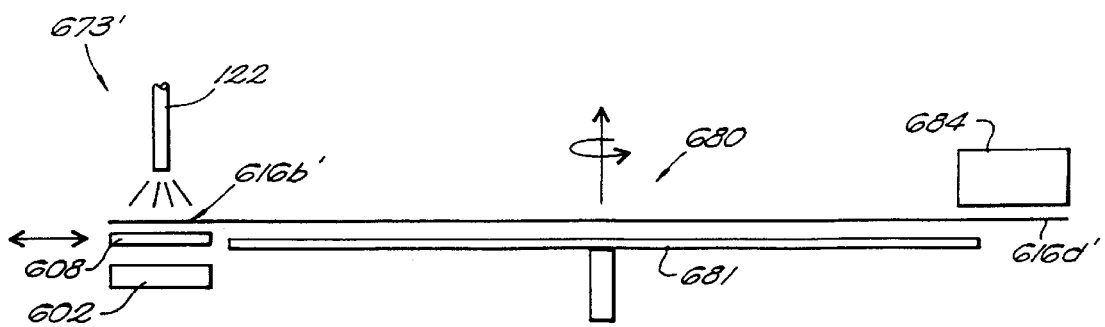
FIG. 9A shows schematically in a side elevation, an embodiment of the apparatus of the invention having a disk of masks, each of which is brought adjacent a stationary porous material and binder deposition stage.
Figure 9B:
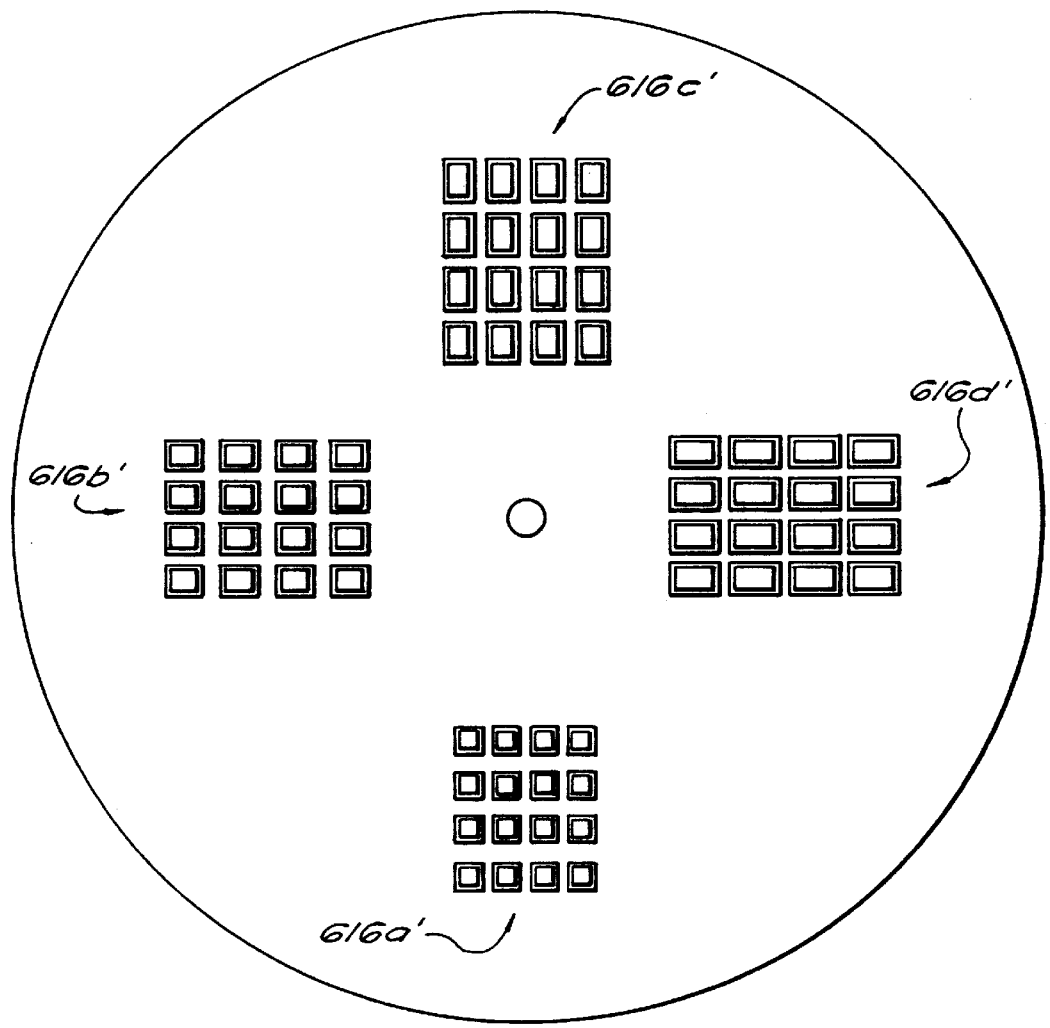
FIG. 9B shows schematically, in a plan view, the disk of masks used with the embodiment of the invention shown in FIG. 9A.

A rotating disk or turntable embodiment of the invention is shown schematically with reference to FIGS. 9A and 9B. This device also includes a support 602, a powder spreader 608 and a binder depositor 122 at a deposition stage 673'. Rather than a continuous roll, the series of masks 616a', 616b', 616c' and 616d' are maintained on a disk 680 that rotates each mask stage past the deposition stage, as appropriate, as discussed above in connection with the roll embodiment. The disk is driven by a suitable drive. A cleaning stage 684 is optionally shown. Alternatively, the disk could be cleaned elsewhere. Typically, the disk of masks 680 is supported by a rigid turntable 681, which has either a reduced radius, or peripheral cutouts near the mask sections. The disk embodiment is useful for a smaller number of masks than would typically be used with the roll embodiment. Multiple nozzles can also be used with the disk embodiment.

Figure 10:
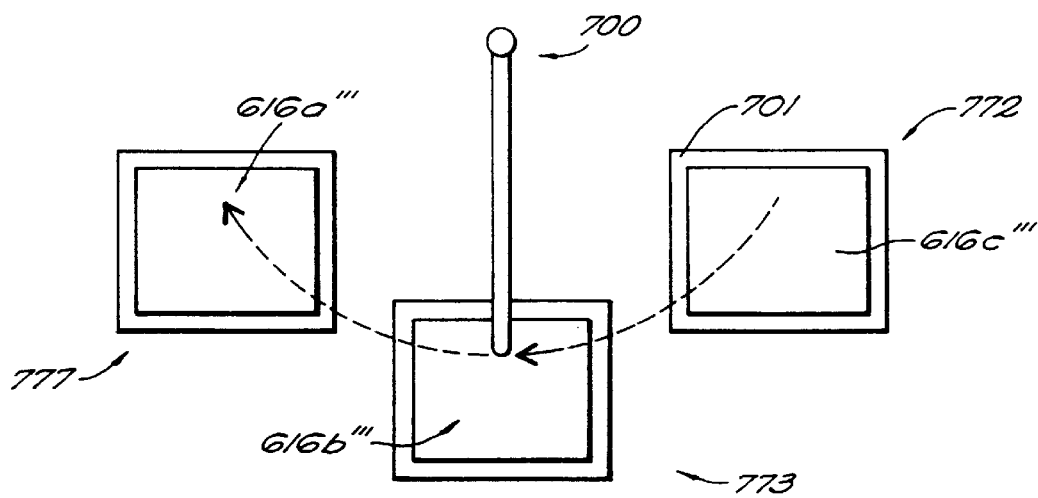
FIG. 10 shows schematically an embodiment of the invention that uses a robot to move a frame held mask to a binder deposition site.

As shown in FIG. 10, it is also possible to mount each mask in a frame 701, and to stack a series of masks 616a''', 616b''', 616c''', . . . in a supply stack 772, from which they are moved by a suitable mechanism, such as a pick-and-place robot 700, or some other suitable device, to the deposition stage 773, and then to a return stack 777.

As mentioned above, the masks can be either open stencil or screen type masks. If an open stencil is used, thin steel or brass (such as on the order of 0.01 in. (0.25 mm) thick) is suitable. The stencil should be rigid and resistive to warping, such as flat tempered steel. It is also possible to use paper or synthetic polymer sheets, or combinations thereof, particularly for disposable masks, although these have limitations of durability, cleanability and dimensional stability. On the other hand they are typically less expensive to fabricate.

The powders and binders that can be used for 3-D printing and that are mentioned in the above referenced Sachs et al. U.S. Pat. No. 5,204,055 and Cima et al. U.S. Pat. No. 5,387,380 and the Allen et al. U.S. patent application Ser. No. 551,012, which have been incorporated herein by reference, are also suitable for the invention disclosed herein.

For example, ceramic powder of 30 micron particle size can be spread and a binder comprised of colloidal silica with 0.1 micron silica particles can be applied onto the powder through the mask. After evaporation of the water in the colloidal silica, the powder bed can be fired and the silica will sinter, resulting in a glass-bonded refractory which is useful as a mold for metal casting or as a filtration medium. The loose powder is removed after the firing operation.

In another embodiment, metal powder, such as stainless steel powder of 60 micron diameter may be spread and then joined by a polymeric binder applied through the mask. Suitable polymeric binders include aqueous based materials such as acrylic latex or solvent based systems with dissolved polymers. Applying the polymeric binder through the mask defines the green part within the powder bed. The green part can then be removed from the powder bed and post-processed, for example by sintering or by infiltrating in the manner described in U.S. patent application Ser. No. 08/551, 012, in the names of Samuel Allen et al.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

The corresponding structures, materials, acts and equivalents of all means or step plus function elements in the claims below are intended to include any structure, material, or acts for performing the functions in combination with other claimed elements as specifically claimed.

Having described the invention, what is claimed is:

1. A process for making a component comprising the steps of:
   a. depositing a layer of a porous material;
   b. positioning a mask near to said deposited layer of porous material;
   c. applying a bonding material that will cause any contacted portions of said porous material to become bonded together, over and through said mask, such that said bonding material is applied to one or more selected regions of said layer of porous material; and
   d. repeating steps (a), (b) and (c) to produce successive layers, said bonding material causing each of said successive layers to become bonded to an adjacent layer.

2. The process of claim 1, further comprising the step of removing any unbonded porous material which is not at said one or more selected regions to provide the component.

3. The process of claim 1, said mask comprising figure regions that are permeable to said bonding material and ground regions that are impervious to said bonding material, said step of applying a bonding material comprising the step of applying said bonding material over both said figure and ground regions of said mask.

4. The process of claim 1, said step of depositing a layer of porous material comprising the step of depositing a layer of loose powder.

5. The process of claim 1, said step of depositing a layer of porous material comprising the step of depositing a body of loosely bound powder.

6. The process of claim 1, said step of applying bonding material comprising the step of spraying droplets of bonding material at said mask.

7. The process of claim 1, said step of applying bonding material comprising the step of directing a jet of droplets of bonding material at said mask.

8. The process of claim 1, said step of applying bonding material comprising the step of directing a jet of continuous fluid bonding material at said mask.

9. The process of claim 6, said step of spraying comprising the step of spraying droplets in a conical pattern.

10. The process of claim 1, said step of positioning said mask comprising the step of contacting said deposited layer of porous material with said mask.

11. The process of claim 1, said step of positioning said mask comprising the step of spacing said mask away from said layer of porous material.

12. The process of claim 1, said step of positioning comprising the step of moving a mask to a stationary bonding material application station.

13. The process of claim 1, said step of positioning comprising the step of moving said layer of porous material to a stationary bonding material application station.

14. The process of claim 12, said step of moving said mask comprising the step of rotating a disk upon which said mask resides.

15. The process of claim 12, said step of moving said mask comprising the step of indexing a sheet upon which said mask resides.

16. The process of claim 12, said step of moving said mask comprising the step of positioning a frame in which said mask resides.

17. The process of claim 1, said step of positioning a mask comprising the step of positioning a plurality of stencil masks for a single layer of porous material.

18. The process of claim 1, said step of positioning a mask comprising the step of positioning a stencil mask having a completely open figure region.

19. The process of claim 1, said step of positioning a mask comprising the step of positioning a screen mask.

20. The process of claim 1, said step of applying bonding material comprising the step of applying an electric charge to said bonding material before it contacts said porous material.

21. The process of claim 20, said step of applying bonding material further comprising the step of establishing an electric field that attracts any said charged bonding material toward said porous material.

22. The process of claim 21, said step of establishing an electromagnetic field comprising the step of electrically coupling said porous material to a voltage source chosen to attract any said charged bonding material.

23. The process of claim 21, said step of establishing an electric field comprising the step of providing an electrically conductive body adjacent said porous material, on the side of said porous material distant from said recently deposited layer, and electromagnetically coupling said conductive body to a voltage source chosen to attract any said charged bonding material.

24. An apparatus for making a component, said apparatus comprising:

a. means for depositing successive layers of a porous material;

b. means for positioning a mask, having figure and ground regions, adjacent each of said successive layers of said porous material; and c. means for applying through a positioned mask, to one or more selected regions of each successive layer of porous material, after each successive layer has been deposited, a bonding material that will cause any porous material to which it is applied to become bonded at said one or more selected regions.

25. An apparatus for making a component, said apparatus comprising:

a. a porous material successive layer depositor;

b. a mask positioner, arranged to position a mask having figure and ground regions, near to each of any successive layers of said porous material deposited by said layer depositor; and c. a bonding material applicator, arranged to apply, through a positioned mask, to one or more selected regions of each successive layer of porous material, after each of any such successive layers has been deposited, a bonding material that will cause the porous material to become bonded at said one or more selected regions.

26. The apparatus of claim 25, said mask positioner comprising a mask sheet advancer that advances a stretch of a continuous mask sheet adjacent said layer depositor.

27. The apparatus of claim 26, said sheet advancer comprising a sheet indexer.

28. The apparatus of claim 25, said mask positioner comprising a disk drive that advances a sector of a mask disk adjacent said layer depositor.

29. The apparatus of claim 26, said mask positioner comprising means for positioning said mask a distance spaced from any said deposited porous material.

30. The apparatus of claim 25, said bonding material applicator comprising a fluid jet applicator.

31. The apparatus of claim 25, said bonding material applicator comprising a fluid spray applicator.

32. The apparatus of claim 25, said bonding material applicator comprising a sonic atomizer.

33. The apparatus of claim 25, said bonding material applicator comprising an ultrasonic atomizer.

34. The apparatus of claim 25, said bonding material applicator comprising air atomizer.

35. The apparatus of claim 25, said bonding material applicator comprising a nozzle.

36. The apparatus of claim 25, said bonding material applicator comprising an orifice.

37. The apparatus of claim 25, said mask positioner comprising a mask locator.

38. The apparatus of claim 25, said bonding material applicator comprising an electrostatic applicator that applies a charge to any bonding material applied thereby.

39. The apparatus of claim 38, further comprising a charge applicator that maintains an electric field that attracts any charged bonding material toward any deposited porous material.

40. The apparatus of claim 34, said air atomizer cmprising a venturi type atomizer.

* * * * *